Oct. 13, 1936.   M. P. WEIGEL   2,056,993
METHOD AND APPARATUS FOR CONTINUOUS DIGESTION
Filed Sept. 3, 1931
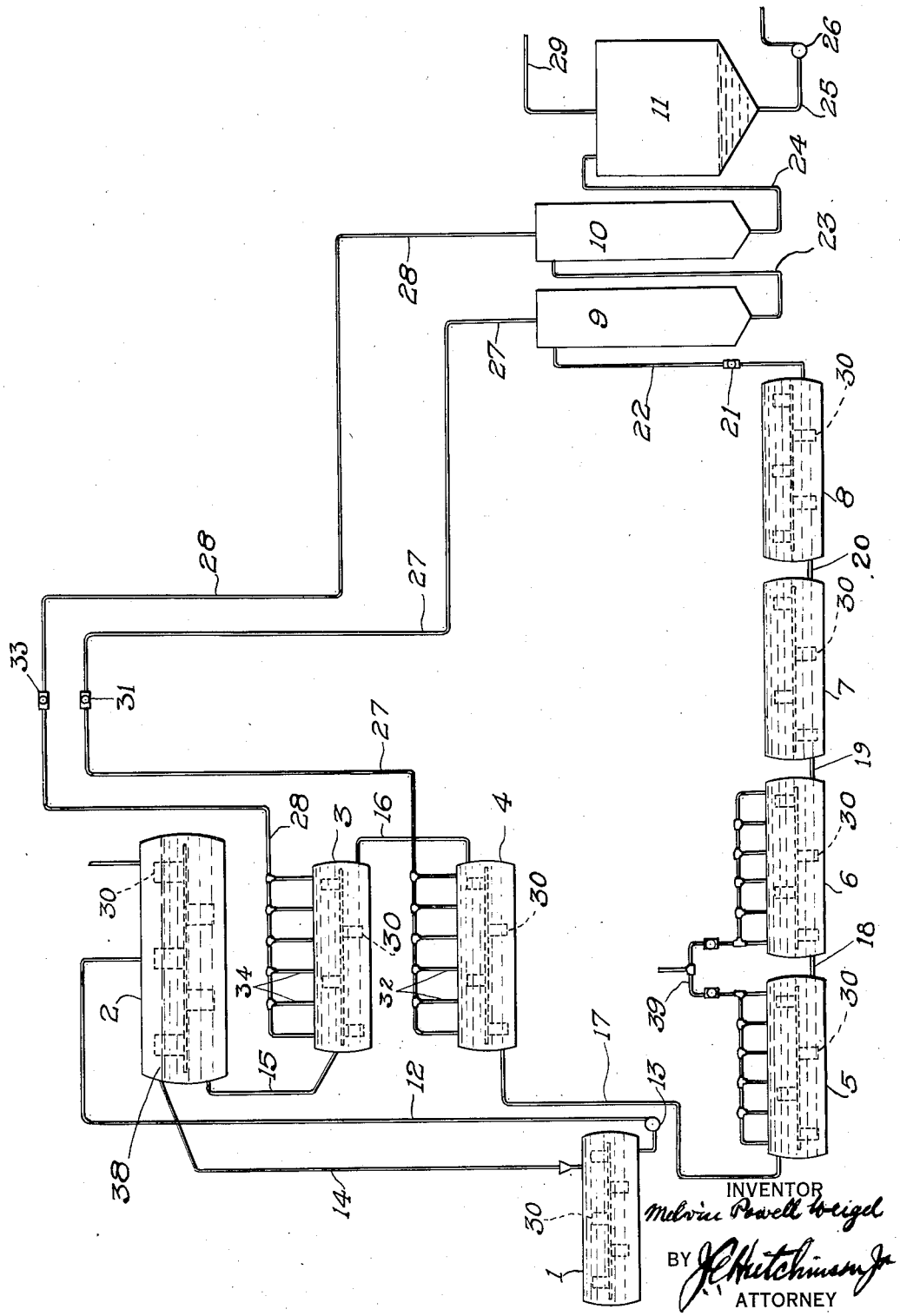

Patented Oct. 13, 1936

2,056,993

UNITED STATES PATENT OFFICE 2,056,993

METHOD AND APPARATUS FOR CONTINUOUS DIGESTION

Melvin Powell Weigel, East St. Louis, Ill., assignor to Aluminum Company of America, Pittsburgh, Pa., a corporation of Pennsylvania Application September 3, 1931, Serial No. 561,081

11 Claims. (Cl. 23—143)

This invention relates to improved methods of producing alumina by the pressure digestion of bauxite or other similar alumina-bearing material and is particularly directed to a continuous method of practicing such a process.

The commercial extraction of alumina from alumina-bearing materials is usually accomplished by the digestion of the material with caustic liquor in an autoclave and under pressure. The alumina-bearing material and liquor, heated by steam to the desired temperature, are digested at this temperature for a predetermined period of time and the mixture is then discharged from the autoclave or pressure vessel. This intermittent type of operation has several disadvantages. The solution of alumina is often incomplete and the undissolved alumina, remaining in the mixture, causes, in the succeeding steps of the process, a premature precipitation of dissolved alumina from the liquor, thus resulting in a reduction in the final yield. Also, excessive heat losses result from variations in temperature and the large quantities of exhaust steam released to the atmosphere upon transfer of the mixture from the autoclave to a discharge tank after each digestion make for inefficient and wasteful operation.

The present invention is directed to a novel and improved method of extracting alumina from alumina-bearing materials, said method being designed to eliminate as completely as possible the disadvantages above mentioned. The invention contemplates a continuous method of extracting alumina from alumina-bearing material which comprises pressure-digesting the material with caustic liquor in stages under successively increasing temperatures and pressures, and then cooling the digested mixture in successive stages of decreasing temperatures and pressures while maintaining a constant flow of the digestion material.

In the preferred practice of my invention I increase the temperature and pressure of the mixture of alumina-bearing material and caustic liquor through several steps or stages to a maximum, maintaining these conditions at all times under a hydrostatic pressure head. I then pass the digestion mixture through a "holding" stage at maximum pressure and thereafter through a plurality of cooling stages. Throughout the entire cycle of operation a constant flow of reaction mixture from step to step and stage to stage is preferably maintained. Under such conditions substantially all of the alumina-bearing material is subjected to optimum digesting conditions and substantially all of the available alumina is dissolved by the caustic liquor. There being substantially no undissolved alumina, the cause for premature precipitation of alumina is eliminated and the yield is, consequently, brought to a maximum.

Furthermore, the practice of my invention results in a very substantial saving in heat consumption in that the steam liberated at each successive cooling stage is liberated continuously at an even rate and at a substantially fixed and high temperature and pressure and may thus be re-employed in the several, and earlier, heating stages.

The process may broadly be considered as comprising a heating period, a holding period and a cooling period. The heating period and the cooling period are comprised of a plurality of heating and cooling stages at each of which the mixture is heated or cooled, as the case may be, a predetermined amount. The number of stages employed may be varied but the invention will be specifically described with reference to three heating and three cooling stages. During the holding period the temperature and pressure remain constant.

In order to clearly explain the principles of my invention I will have reference to the drawing which represents, in schematic outline, a flow sheet of a process embodying the invention.

Referring to the drawing, the apparatus which may be used in the practice of my invention comprises the mixing tank 1, the surge tank 2, the heating tanks 3, 4, 5 and 6, the holding tanks 7 and 8, the cooling chambers 9, 10 and 11 and the pipe lines, pumps and similar tank-connecting and mixture-transferring means hereinafter referred to. The mixing tank, the surge tank, the heating tanks and the holding tanks are each equipped with agitators 30 to prevent settling of the solids from the mixture. The reaction mixture enters the process at tank 1 and leaves it at cooling chamber 11, whence it goes for further treatment to a system of filter presses which remove the insoluble material. This further treatment is well known and forms no part of this invention.

The reactants, which may consist of alumina-bearing material, such as bauxite, and caustic liquor are placed in the mixing tank 1. The mixture is heated to the desired temperature and is thereafter forced by pump 13 through conveying line 12 into the head or surge tank 2. The level of the mixture in the surge tank is constantly maintained by overflow pipe 14 leading from the surge tank to the mixing tank 1. The surge tank 2 is situated at a higher level than heating tank 3 which tank, in turn, is situated at a higher level than heating tank 4 which tank is, in turn, situated at a higher level than the tanks 5, 6, 7 and 8 which may be placed on the ground floor.

From the surge tank 2 the mixture flows by gravity and through pipe line 15 into heating tank 3, where the temperature of the digesting mixture is raised a predetermined amount. From tank 3 the mixture continues its flow through pipe line 16 into heating tank 4, where the temperature of the mixture is again increased. From heating tank 4 and through pipe line 17 the mixture flows to heating tank 5 and heating tank 6 which are connected by pipe line 18. In the tanks 5 and 6 the temperature of the mixture is further raised to the maximum temperature desired.

From the heating tanks 5 and 6 the mixture flows through pipe line 19 into holding tank 7 and from there through pipe line 20 into holding tank 8. In holding tanks 7 and 8 the temperature is maintained at maximum temperature, or the temperature at which the mixture left heating tanks 5 and 6.

From the constant level 38 in surge tank 2 through all heating and holding tanks 3, 4, 5, 6, 7, and 8 the equipment is completely filled with digesting mixture, so that a hydrostatic pressure head is maintained throughout. The heating cycle is complete when the mixture passes from tank 6. Tanks 7 and 8 act only to carry out the holding stage of the process during which a definite interval, depending upon the composition of the mixture, elapses which permits complete solution of the alumina in the caustic liquor.

It will be apparent that the levels of tanks 2, 3, and 4 must be so arranged that a hydrostatic pressure exists between these tanks separately and between these tanks and the tanks 5, 6, 7, and 8, and that this pressure must be sufficient to cause the proper and desired pressures in the heating tanks 3, 4, 5, and 6 and the holding tanks 7 and 8. This may be readily accomplished, in the embodiment of the invention here described, by a proper adjustment of the level of the surge tank 2 and the heating tanks 3 and 4 with reference to the level of the tanks 5, 6, 7, and 8.

From the holding tank 8 the mixture passes through pipe line 22 and control valve 21 into the cooling stages of the process, which cooling takes place in the cooling chambers or blow-off tanks 9, 10, and 11. The mixture first passes into cooling chamber 9 which is connected, by pipe line 23, to cooling chamber 10 and by steam line 27, through check valve 31, to steam jets 32 which lead into heating tank 4. The cooling in chamber 9 is so carried out that steam is released at a pressure sufficient to carry it through the steam line 27 and steam jets 32 into heating tank 4. The flow of material into cooling chamber 9 is continuous but controlled in volume by control valve 21. The mixture, after being partially cooled in chamber 9, then flows, as a result of the pressure in chamber 9, through pipe line 23 into cooling chamber 10, in which chamber the mixture is further cooled. Cooling chamber 10 is connected with cooling chamber 11 by pipe line 24 and with heating tank 3 by steam line 28. The cooling in chamber 10 is so carried out that steam is released at a pressure sufficient to carry it through steam line 28, check valve 33 and steam jets 34 into heating tank 3. However, the total pressure in chamber 10 is lower than the pressure in chamber 9 and higher than the pressure in chamber 11, so that the flow of the digestion mixture from chamber 9 through pipe line 23 to chamber 10 and thence through pipe line 24 to chamber 11 is at all times maintained. In chamber 11 the last cooling stage takes place and the low pressure steam released therein is led, by means of steam line 29, to be utilized where low pressure steam may be employed. The mixture flows from chamber 11 through pump 26 and pipe line 25 to the further processing of the mixture which, as hereinabove mentioned, forms no part of the present invention. It will be noted that in the operation of the process now being described it is necessary only to apply new heat to the mixing tank 1, which may be heated by any convenient means, and to heating tanks 5 and 6 which are preferably heated by steam fed through the steam pipe 39 which is in turn connected with any source of steam sufficient in pressure.

Although I have described my invention with reference to a particular embodiment thereof, it will be apparent that it is by no means limited to the details of operation, the temperatures, pressures, compositions or substances described, but may be utilized to advantage in any and all similar methods of pressure digesting aluminous material. It is to be further noted that although I have described the pressure head as being maintained by gravity, the pressures may be maintained by other means where opportunity permits or expediency dictates.

I claim:

1. A continuous method of extracting alumina from aluminous material which comprises pressure-digesting aluminous material with caustic liquor in successive separate stages of increasing temperatures and pressures, and then cooling in successsive separate stages of decreasing temperatures and pressures and maintaining a constant flow of digestion mixture through the several stages of digestion and cooling.

2. A method of continuously extracting alumina from aluminous material which comprises digesting the material with caustic liquor in successive separate stages of increasing temperatures and pressures, said pressures being maintained hydrostatically, and then cooling in successive separate stages of decreasing pressures and temperatures, maintaining a constant flow of digestion mixture through the several stages of digestion and cooling.

3. A method of continuously extracting alumina from aluminous material which comprises digesting the material with caustic liquor in successive separate stages of increasing temperatures and pressures, and then cooling in successive separate stages of decreasing pressures and temperatures, maintaining a constant flow of digestion mixture through the several stages of digestion and cooling and supplying the heat required for several of the digesting stages by withdrawing it from several of the successive cooling stages.

4. A continuous method of carrying out a pressure digestion which comprises pressure-digesting the material for extraction with a solvent in successive separate stages of increasing temperatures and pressures, and then cooling in successive separate stages of decreasing pressures and temperatures and maintaining a constant flow of digestion mixture through the several stages of digestion and cooling and supplying the heat required for several of the digesting stages by withdrawing it from several of the successive cooling stages.

5. A continuous method of carrying out a pressure digestion, which comprises pressure-digesting the material for extraction with a solvent in a plurality of separate stages maintained under progressively increasing temperatures and pressures and then cooling in a plurality of separate stages of decreasing temperatures and pressures and maintaining a constant flow of digestion mixture through the several digesting and cooling stages, the decrease in pressure between successive cooling stages being such that vapor is liberated and employed under its own pressure head to supply heat to a digesting stage.

6. A method of extracting alumina from aluminous material, which comprises increasing the temperature and pressure of a mixture of aluminous material and caustic liquor in a plurality of separate stages to the desired maximum digesting temperature and pressure, maintaining the mixture at the maximum temperature and pressures, then cooling the mixture in a plurality of separate stages of decreasing temperature and pressure, and maintaining a continuous flow of the mixture through the digesting stages and the cooling stages, the decreases in pressure between successive cooling stages being such that steam is liberated under such pressures and in such quantity that it is adapted to supply heat required by several of the digesting stages, and employing liberated steam to supply heat to several digesting stages.

7. Apparatus for continuous pressure digestion, which comprises, in combination, a series of connected closed digesting vessels provided with agitators and adapted to the pressure digestion of the material for extraction with a solvent in stages maintained under progressively increasing temperature and pressure, a series of connected cooling vessels in operative connection with the series of digesting vessels and adapted to cool the material in stages maintained at successively decreasing temperatures and pressures, means for maintaining a continuous flow of material through the digesting stages and the cooling stages, means for separating and withdrawing steam liberated by the decrease in pressure between successive cooling stages and means connected with the withdrawing means for employing the steam to supply heat to a digesting stage.

8. In an apparatus for extracting solids with solvents by continuous pressure digestion, a system of elements connected together in series, comprising a mixing tank, a surge tank, heating tanks, holding tanks and cooling chambers, said surge tank being positioned to supply a mixture of said solids and solvents to said heating tanks under hydrostatic pressure, and means including a pump positioned between the mixing tank and surge tank for maintaining a substantially constant level of said mixture of solids and solvents in said surge tank, valve means between the last holding tank and first cooling chamber for maintaining a hydrostatic pressure on the system, and pipe lines connecting the cooling chambers with certain of the heating tanks, said pipe lines being adapted to convey steam, produced on cooling the mixture in the cooling chambers, to the certain heating tanks.

9. In an apparatus for extracting solids with solvents by continuous pressure digestion, a system of elements connected together in series, comprising a mixing tank, a surge tank, heating tanks, holding tanks and cooling chambers, said surge tank being positioned to supply a mixture of said solids and solvents to said heating tanks under hydrostatic pressure, and means including a pump positioned between the mixing tank and surge tank for maintaining a substantially constant level of said mixture of solids and solvents in said surge tank, valve means between the last holding tank and first cooling chamber for maintaining a hydrostatic pressure on the system, and separate pipe and valve means connecting individual cooling chambers with individual heating tanks, said separate valves being adapted to control the pressure and amount of cooling in each individual cooling chamber, and said separate pipe means being adapted to convey steam, produced on cooling the mixture in the cooling chambers, to the individual heating tanks.

10. In an apparatus for extracting solids with solvents by continuous pressure digestion, a system of elements connected together in series, comprising a mixing tank, a surge tank, heating tanks, holding tanks and cooling chambers, said surge tank being positioned to supply a mixture of said solids and solvents to said heating tanks under hydrostatic pressure, and means including a pump positioned between the mixing tank and surge tank for maintaining a substantially constant level of said mixture of solids and solvents to the system under hydrostatic pressure, said heating tanks being positioned at relatively decreasing elevations whereby the pressures therein increase respectively, valve means between the last holding tank and first cooling chamber for maintaining a hydrostatic pressure on the system, and pipe lines connecting the cooling chambers with certain of the heating tanks, said pipe lines being adapted to convey steam, produced on cooling the mixture in the cooling chambers, to the certain heating tanks.

11. In an apparatus for extracting solids with solvents by continuous pressure digestion, a system of elements connected together in series, comprising a mixing tank, a surge tank, heating tanks, holding tanks and cooling chambers, said surge tank being positioned to supply a mixture of said solids and solvents to said heating tanks under hydrostatic pressure, and means including a pump positioned between the mixing tank and surge tank for maintaining a substantially constant level of said mixture of solids and solvents in said surge tank, said heating tanks being positioned at relatively decreasing elevations whereby the pressures therein increase respectively, valve means between the last holding tank and first cooling chamber for maintaining a hydrostatic pressure on the system, and separate pipe and valve means connecting individual cooling chambers with individual heating tanks, said separate valves being adapted to control the pressure and amount of cooling in each individual cooling chamber, and said separate pipe means being adapted to convey steam, produced on cooling the mixture in the cooling chambers, to the individual heating tanks.

MELVIN POWELL WEIGEL.

CERTIFICATE OF CORRECTION.

Patent No. 2,056,993.

October 13, 1936.

MELVIN POWELL WEIGEL.

It is hereby certified that error appears in the printed specification of the above numbered patent requiring correction as follows: Page 3, first column, line 24, claim 6, for the word "pressures" read pressure; and second column, line 34, claim 10, for the words "to the system under hydrostatic pressure" read in said surge tank; and that the said Letters Patent should be read with these corrections therein that the same may conform to the record of the case in the Patent Office.

Signed and sealed this 29th day of December, A. D. 1936.

Henry Van Arsdale (Seal)

Acting Commissioner of Patents.